Oct. 21, 1969      D. J. BLUNDEN      3,473,487
VEHICLE TIEDOWN STRUCTURE
Filed Feb. 14, 1967      4 Sheets-Sheet 1
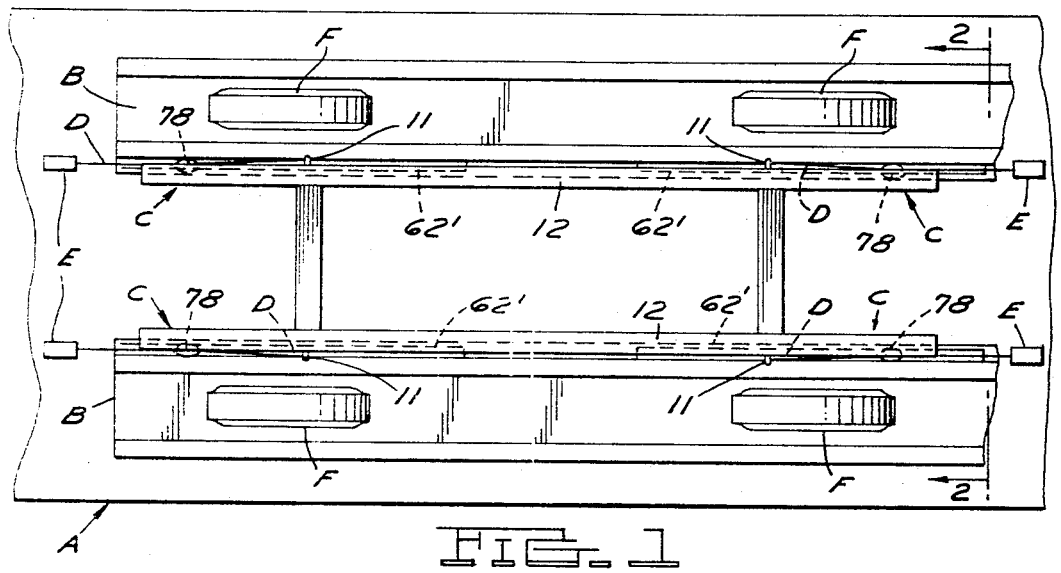
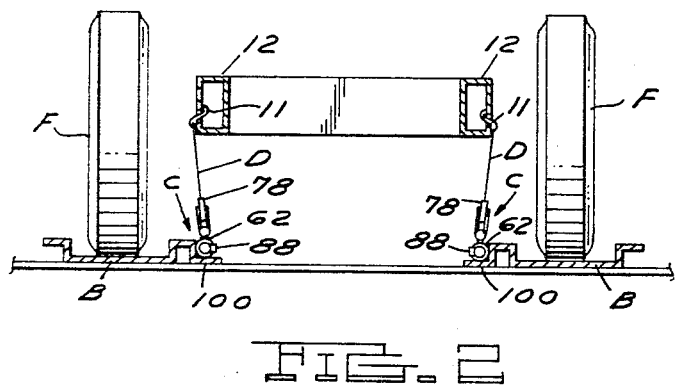
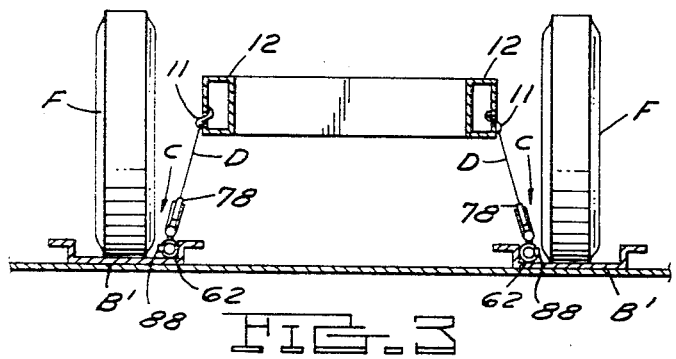
INVENTOR
DONALD J. BLUNDEN
BY
Whittemore, Hulbert & Belknap
ATTORNEYS

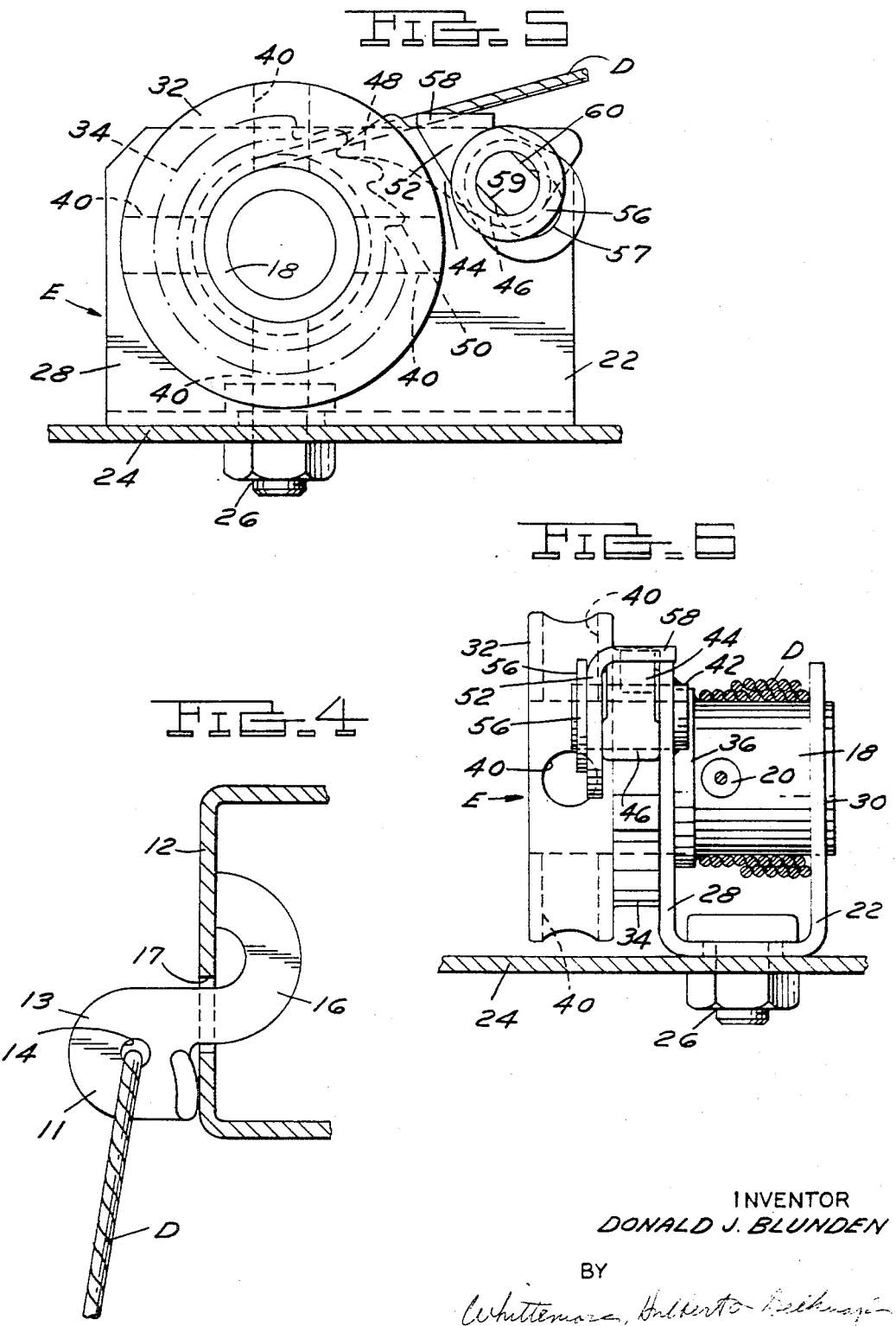

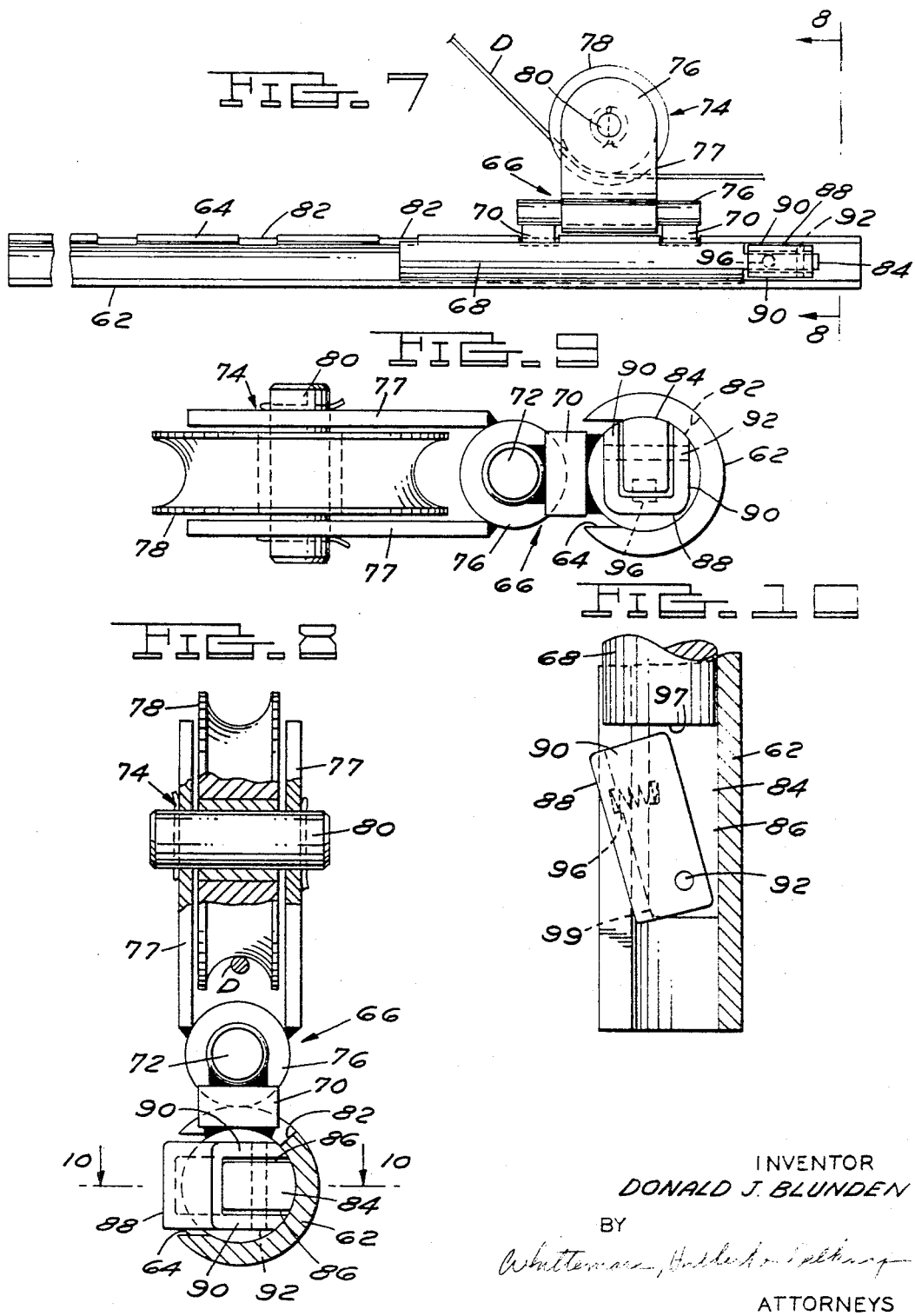

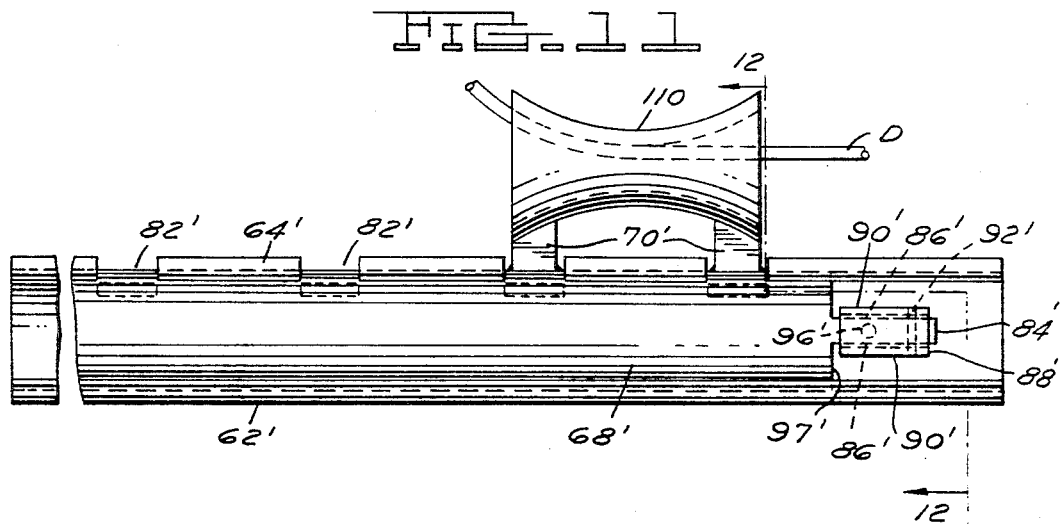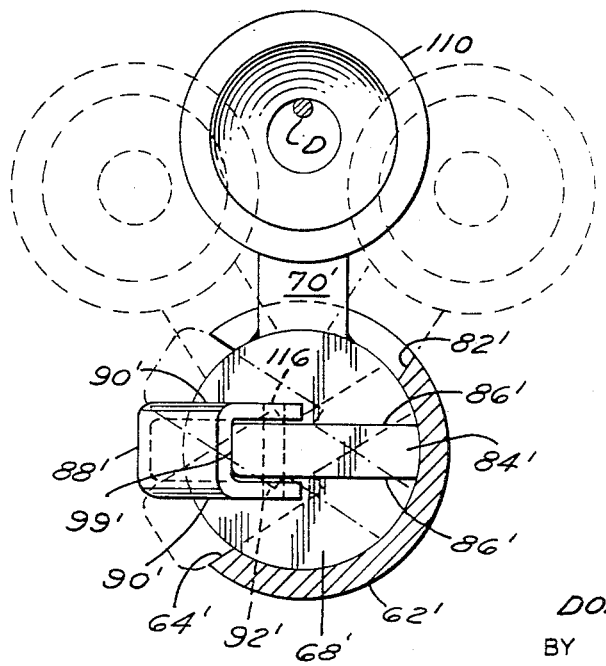

United States Patent Office 3,473,487
Patented Oct. 21, 1969

3,473,487
VEHICLE TIEDOWN STRUCTURE
Donald J. Blunden, Southfield, Mich., assignor to Whitehead & Kales Company, Southfield, Mich., a corporation of Michigan
Filed Feb. 14, 1967, Ser. No. 616,072
Int. Cl. B61d 45/00
U.S. Cl. 105—369       6 Claims

ABSTRACT OF THE DISCLOSURE

The tiedown structure comprises an elongated tubular member which is adapted to be secured lengthwise upon the longitudinally extending support structure of the transport vehicle. A bar is longitudinally slidable within the elongated tubular member. The bar has a pair of longitudinally spaced locking lugs projecting through a longitudinal slot in the side wall of the tubular member. The tubular member has a series of transverse notches communicating with the longitudinal slot. The notches are spaced apart the same distance as the lugs so that when the bar is rotated in one direction the lugs will engage in selected notches and prevent the bar from moving longitudinally. A releasable locking dog is provided to lock the bar against reverse rotation.

This invention relates generally to tiedown structure and refers more particularly to structure for tying down and holding a cargo such, for example, as a vehicle upon the support structure of a transport vehicle.

A flexible element or cable is attached to the cargo and held under tension to tiedown and hold the cargo upon the support structure of the transport vehicle.

An intermediate portion of the cable extends under a member carried by the bar. In one embodiment of the invention, this member comprises a sheave which is mounted on a bracket pivoted to the lugs permitting transverse movement of the sheave. In a second embodiment of the invention, this member comprises a tube through which the cable extends and which is mounted on the locking lugs and has an internal cross-section which flares at both ends. In this second embodiment, the bar is capable of rotating through a limited angle so that the position of the tube is adjustable transversely.

BACKGROUND OF THE INVENTION

Although the invention broadly refers to structure for tying down and holding cargo upon the longitudinally extending support structure of any transport vehicle, it is particularly intended for use on carry car trailers where the available space for tiedown structures is severely limited. One problem has been to design a tiedown structure which will be accessible but which will not take up more than the available space.

My tiedown structure engages and guides an intermediate portion of the cable in a manner such that the cable when attached to the cargo will apply tension in the proper direction even though the part of the cargo to which the cable is connected may be located a considerable distance from the ratchet or other device for holding the cable in tension. Moreover, the tiedown structure is adjustable to take care of the fact that the location of the part of the cargo to which the cable is attached may vary considerably both longitudinally and transversely.

SUMMARY OF INVENTION

It is an essential object of the invention to provide a tiedown structure for tying down and holding a cargo upon the support structure of a transport vehicle which is readily adjustable relative to the support structure.

Another object is to provide tiedown structure which is designed to fit into the limited space available on certain transport vehicles such as carry car trailers.

Another object is to provide tiedown structure which is adjustable longitudinally and transversely.

Another object is to provide the tiedown structure with releasable means for locking the same in selected positions of longitudinal adjustment.

Another object is to provide a tiedown structure including a sheave under which an intermedaite portion of the flexible element or cable extends.

Another object is to provide a tiedown structure including a tube which is internally flared at both ends and through which an intermediate portion of the flexible element or cable is adapted to extend.

Other objects and features of the invention will become apparent as the description proceeds, especially when taken in conjunction with the accompanying drawings wherein:

FIGURE 1 is a fragmentary top plan view of a transport vehicle having a longitudinally extending vehicle-supporting track structure equipped with tiedown structure embodying my invention, showing the positions of four ground-engaging wheels of one vehicle supported thereon, and also showing portions of the vehicle frame to which the flexible elements or cables of the tiedown structure are attached.

FIGURE 2 is a transverse sectional view taken on the line 2—2 of FIGURE 1.

FIGURE 3 is a view similar to FIGURE 2 but showing a modification.

FIGURE 4 is an enlarged fragmentary sectional view of a portion of FIGURE 2, showing a hook on the end of a cable releasably attached to a portion of the frame of a vehicle.

FIGURE 5 is a fragmentary side view, with parts in section, of one form of cable tensioning device that may be employed.

FIGURE 6 is a fragmentary view, with parts in section, of the tensioning device as seen from the right in FIGURE 5.

FIGURE 7 is a side view, with parts broken away, of the tiedown structure.

FIGURE 8 is a sectional view taken on the line 8—8 of FIGURE 7.

FIGURE 9 is an end view generally similar to FIGURE 8 but showing the structure in a different position.

FIGURE 10 is a fragmentary sectional view taken on the line 10—10 of FIGURE 8.

FIGURE 11 is a side view similar to FIGURE 7 but showing a modification.

FIGURE 12 is a sectional view taken on the line 12—12 of FIGURE 11.

Referring now more particularly to the drawings, and especially to FIGURES 1, 2 and 4–10, A is a transport vehicle, in this instance a carry car trailer, having mounted thereon a pair of elongated, parallel, longitudinally extending, laterally spaced tracks B, said tracks constituting the vehicle support structure for supporting one or more vehicles. C are the tiedown structures each including an elongated flexible element or cable D. Tensioning devices are indicated at E. Also shown in FIGURE 1 are the four ground engaging wheels F of a vehicle supported on the tracks B, and constituting the cargo to be transported by vehicle A.

Preferably, four tiedown structures are provided for each vehicle, and as best seen in FIGURES 1 and 4 a hook 11 is secured to one end of each cable D for attachment to the frame 12 of the vehicle. The hook 11 may be generally S-shaped as shown having a body portion 13 provided with an eye 14 to which the end of the cable is attached, and having a generally U-shaped portion 16 adapted to extend through a hole 17 in the vehicle frame 12.

As above stated each tiedown structure includes a tensioning device E which may be of any suitable construction and in the present instance is shown as being of the ratchet type. The tensioning device is best seen in FIGURES 5 and 6 and includes a drum 18 upon which the cable is wrapped, the cable end being attached to the drum by a suitable fastener 20. The tensioning device E has an upright generally U-shaped frame 22 secured upon a frame member 24 of the transport vehicle by a suitable fastener assembly 26 which extends through a hole in the base of the frame 22. The vertical side flanges 28 and 30 of the frame 22 extend in laterally spaced parallel relation to one another and are provided with aligned holes through which the drum extends and in which the drum is free to rotate. The drum has an extension projecting outward beyond flange 28 of the frame, and a ratchet wheel 32 is fixedly secured concentrically on the outer projecting end portion of the drum. A ratchet gear 34 is disposed between the flange 28 of frame 22 and the ratchet wheel 32 being rigidly secured in concentric relation to the latter. The drum 18 has a collar 36 secured to it on the inner side of flange 28. Accordingly, the ratchet gear 34 and collar 36 prevent longitudinal movement of drum 18, without interfering with its rotation.

The ratchet wheel 32 is provided with a plurality of radial holes 40 for the reception of the end of a tool by means of which the drum 18 may be rotated to cause cable D to be wound on the drum and thereby tensioned or tightened when it is desired to tie down a vehicle.

There is a transversely extending fixed stub shaft 42 permanently secured to the flange 28 of frame 22, extending in an outward direction therefrom. A manually operable pawl 44 is provided at one end with a hub 46 rotatably mounted on the fixed shaft 42 on the outer projecting end thereof. The pawl 44 has a free end portion 48 that is engageable with one of the teeth 50 of ratchet gear 34 to hold the latter, as well as the drum 18, against rotation in a clockwise direction as viewed in FIGURE 5 when the tiedown cable D has been tightened.

Mounted for both rotary and transverse sliding movements relative to the fixed shaft 42 is a pawl lock 52 for the manually operable pawl 44. As shown, this pawl lock 52 is located between the pawl 44 and an annular disc 56 fixed upon the outer projecting end of stub shaft 42. The pawl 44 and pawl lock 52 are held against axial movement on the stub shaft 42 by the flange 28 of frame 22 and disc 56. Preferably this pawl lock is provided with a laterally projecting arm or flange 58 which is adapted during rotary movement of the pawl lock 52 relative to stub shaft 42 to extend transversely over and in spaced relation to the upper edge of the pawl 44 when the latter is in engagement with one of the teeth 50 of the ratchet gear 34, and that is adapted during sliding movement of the pawl lock 52 transversely of shaft 42 to engage and hold the pawl 44 against accidental displacement from the engaged tooth of the ratchet gear 34. As shown, this pawl lock 52 has a circular opening 57 to receive the stub shaft 42 during rotary movement of the pawl lock relative to the shaft, and has at one edge of the circular opening an elongated slot 59 adapted to receive and straddle diametrically opposed flat portions 60 of shaft 42 during sliding movement of the pawl lock 52 transversely of shaft 42 to thereby hold the pawl lock 52 against rotation so that the pawl 44 will be maintained in locked position. Thus the pawl lock 52 may be rotated to and from a position where the laterally projecting arm or flange 58 is spaced above the pawl 44, and then may be slid transversely of the shaft 42 to position the laterally projecting arm or flange 58 in locking engagement with the pawl 44.

As seen in FIGURES 7–10, each tiedown structure includes an elongated tubular member 62 having a longitudinal slot 64 in a side wall of the member. The slot 64 has straight, parallel longitudinal edges and extends throughout the full length of the member 62. An anchor device 66 has an elongated cylindrical rod or bar 68 longitudinally slidable and rotatable within the tubular member 62. The inner surface of the tubular member is substantially of the same cylindrical form as the bar 68.

The bar 68 has a pair of longitudinally spaced, radially outwardly extending locking lugs 70, and a cylindrical shaft 72 extending parallel to bar 68 is permanently secured to the locking lugs. A sheave assembly 74 includes a sleeve 76 rotatably mounted on shaft 72 between the locking lugs 70, and a pair of laterally spaced, parallel flanges 77 permanently secured to the sleeve 76. A sheave 78 is rotatably mounted between the flanges 77 on an axle 80 extending between the flanges. An intermediate portion of the cable D between the tensioning device E and the hook 11 passes under the sheave 78. The sheave 78 serves as a guide member for the cable, determining the direction of the tension applied on the vehicle frame by the cable.

The elongated tubular member 62 has a plurality of equally spaced transverse notches 82 along the length thereof which communicate with the longitudinal slot 64. The notches 82 are wide enough to receive the locking lugs 70 and are spaced apart the same distance as the locking lugs. Hence when the bar 68 is rotated in one direction in the tubular member to move the locking lugs into a pair of adjacent notches, the anchor device 66 is prevented from moving longitudinally relative to the tubular member 62. The anchor device 66 may be adjusted longitudinally by reverse rotation of the bar to withdraw the locking lugs from the notches. When the anchor device is adjusted longitudinally, the locking lugs 70 extend into the longitudinal slot 64 in the tubular member 62. The longitudinal edges of slot 64, of course, clear the locking lugs 70 as can be seen in FIGURE 9.

One end of the bar 68 has a reduced portion 84 provided with opposed parallel flats 86, and a channel-shaped locking dog 88 straddles the reduced portion 84 with its opposite parallel flanges 90 extending alongside the flats 86. A pin 92 extending through the reduced portion 84 and through the flanges 90 of the locking dog 88 serves to mount the latter on the reduced portion for pivotal movement. A compression coil spring 96 has one end disposed in a socket recess in the base of the locking dog 88 and the other end disposed in a socket recess in the reduced portion 84, the spring urging the locking dog outward to its operative position shown in FIGURE 10 in which it projects into the longitudinal slot 64 between the longitudinal edges thereof. The locking dog 88 is prevented from moving outward beyond the operative position shown in FIGURE 10 by engagement of the base or transverse part of the locking dog 88 with the corner 99 of reduced end portion 84. Alternatively, the flanges 90 could be extended slightly so as to engage the transverse surface 97 and in that manner prevent outward movement of dog 88 beyond its operative position. In the operative position of the locking dog 88, the bar 68 is restricted from rotation and held in the position of FIGURE 8 in which the locking lugs 70 are disposed in a pair of adjacent transverse notches 82. Hence in this position of the locking dog 88, the anchor device 66 is locked against movement lengthwise with respect to the tubular member. The width of the locking dog 88 takes up substantially the full width of the longitudinal slot 62 so that the locking lugs 70 cannot accidentally come out of the transverse notches 82.

The locking dog may be moved to an inoperative position against the force of spring 96 by thumb pressure, the inoperative position being shown in FIGURE 9 in which the locking dog is disposed in substantial alignment with the bar 68 and is withdrawn radially inwardly with respect to the longitudinal slot 64. In the inoperative position of FIGURE 9, the bar 68 may be rotated to withdraw the locking lugs 70 from the transverse notches 82 and move the bar to a different position of longitudinal adjustment.

FIGURE 2 illustrates one mounting for the tubular members 62. The tracks B which are of substantially channel-shape have L-shaped extensions 100 along their inner edges. The tubular members 62 are fixedly secured in the recesses of the L-shaped extensions so as to extend lengthwise of the tracks and in positions such that their longitudinal slots 64 are horizontal and face inwardly and their transverse notches 82 are uppermost.

FIGURE 3 illustrates a modification in which the generally channel-shaped track members B' differ from the track members B in that the L-shaped recesses are omitted. The tubular members 62 are fixedly secured within the channel-shaped tracks B' along the inner edges thereof so as to extend lengthwise of the tracks and in positions such that their longitudinal slots 64 are horizontal but face outward and their transverse notches 82 are uppermost.

It will be noted in both FIGURES 2 and 3 that the sheave assemblies 74 assume the appropriate angles depending upon the point on the frame 12 of the vehicle where the hooks 11 are attached. The sheave assemblies 74 assume the appropriate anglar position when the cables D are tightened, being free to oscillate transversely about the axis of the shaft 72. The sheave assemblies when not in use will lay over to one side and thus not obstruct the underparts of a car being loaded or unloaded. Moreover, since the tubular members are disposed lengthwise of the tracks, the sheave assemblies can be adjusted readily in a lengthwise direction, as already described.

The operation of the tiedown structure should be clear from the foregoing. The locking dog 88 of a tiedown structure is pressed inward to clear slot 64 and the bar rotated to the FIGURE 9 position when it is desired to longitudinally adjust the anchor device 66. When the desired position of longitudinal adjustment is reached, the bar 68 is rotated in the reverse direction to cause locking lugs 70 to enter a pair of transverse notches 82, whereupon the locking dog 88 automatically snaps to its operative position of FIGURES 8 and 10 in which it restricts the bar 68 from rotation so as to retain the locking lugs 70 in the transverse notches 82 and thus lock the anchor device 66 in longitudinally adjusted position.

The cable D passing under sheave 78 will have its hook 11 attached to the frame 12 of the vehicle, and the tensioning device E may be operated by the insertion of a tool in a hole 40 of ratchet wheel 32 to tension the cable. Tensioning of the cables of the tie-down structures will compress the springs of the vehicle enough to hold the vehicle securely on the tracks and also to reduce the overall height of the transport vehicle A so as to clear viaducts, bridges and the like.

FIGURES 11 and 12 show a modification of the invention. The tubular member 62' is substantially the same as tubular member 62 but is of a larger diameter, has a wider longitudinal slot 64', and has deeper transverse notches 82'. The bar 68' is cylindrical and has a longitudinally slidable and rotatable fit within the cylindrical inner surface of the tubular member 62'. The locking lugs 70' are fixedly secured to and project radially from the bar 68' and are spaced apart longitudinally the same distance as the spacing between the transverse notches 82'.

Instead of a sheave assembly, there is provided as a guide member for the cable an elongated tube 110 through which the intermediate portion of the cable extends. The tube 110 is fixedly secured to the locking lugs 70' so that its longitudinal axis is parallel to bar 68'. The tube 110 is flared at both ends. Its internal cross-section may be substantially circular throughout but is preferably a minimum at the midpoint in the length of the tube and gradually flares or increases in diameter toward both ends. The flaring construction of the tube permits the cable to more readily extend at the necessary angle without rubbing or wearing.

The bar 68' has a reduced portion 84' at one end providing a pair of opposed parallel flats 86'. A pin 92' extending through the reduced portion 84' and through the parallel side flanges 90' of the straddling channel-shaped locking dog 88', supports the locking dog 88' pivotally for movement between its operative and inoperative positions. The compression coil spring 96' has its ends disposed in recesses in the end portion 84' and in the base of locking dog 88' and urges the locking dog outward to an operative position shown in FIGURE 12 in which it extends into the longitudinal slot 64' of the tubular member, but as with the previous embodiment thumb pressure may be applied to force the locking dog 88' to an inoperative position within the tubular member 62' and clear of the longitudinal slots in order to rotate bar 68'.

When the bar 68' is in the FIGURE 12 position with the locking lugs 70' extending into two adjacent transverse notches 82', the locking dog 88' projects into the longitudinal slot. However, it is noted that the longitudinal slot is considerably wider than the locking dog 88' permitting a considerable range of rocking movement of the bar 68' between the limit of the opposite longitudinal edges of the slot 64'. It will be apparent that while a considerable rocking movement is permitted, the notches 82' are of such depth that the locking lugs 70' do not move out of the notches throughout the range of rocking movement. Accordingly the tube 110 is free to move through a considerable arc transversely (see FIGURE 12) as required by the location of the vehicle frame 12 to which the hook 11 is connected while still locked in a longitudinallly adjusted position. It is also clear that a longitudinal adjustment may be readily effected by depression of the locking dog 88' and rotation of the bar to rotate bar 68' and move the locking lugs from the transverse notches 82' into the longitudinal slot 64'. When the bar 68' is reverse rotated to move the locking lugs 70' into another pair of notches, the locking dog 88' will automatically snap out to the operative position of FIGURE 12 by spring pressure. The locking dog is prevented from moving outward beyond its operative position by engagement of its flange 90' with the transverse surface 97' of bar 68' and/or engagement of its base or transverse part with the corner 99' of reduced end portion 84'.

It will be understood that the tiedown structure shown in FIGURES 11 and 12 can be substituted for the structure shown in FIGURES 7–10 and used with the tensioning device E and hook 11 to tie down a vehicle. The tubular members 62' when used will of course be fixedly secured in the same position and manner as tubular members 62 to the tracks B or B' with their longitudinal slots 64' horizontal and facing inward with the tracks B or horizontal and facing outward with the tracks B', and with their notches 82' uppermost.

What I claim as my invention is:

1. Tiedown structure comprising an elongated tubular member secured lengthwise upon a longitudinally extending support structure of a transport vehicle, an anchor device including a bar longitudinally slidable within said elongated tubular member, means for releasably locking said bar in selective positions of longitudinal adjustment, means for tying down and holding cargo upon said support structure including an elongated flexible element adapted to be connected to the cargo, means for holding said flexible element in tension, said anchor device having a guide member engaging said flexible element between said holding means and the cargo to determine the direction of the tension applied to said cargo by said flexible element, said guide member comprising a sheave under which said flexible element extends, and means pivotally mounting said sheave on said bar permitting oscillation thereof transversely of said elongated tubular member.

2. Tiedown structure comprising an elongated tubular member secured lengthwise upon a longitudinally extending support structure of a transport vehicle, an anchor device including a bar longitudinally slidable and rotatable within said elongated tubular member, said elongated tubular member having a longitudinal slot in a side wall thereof and having longitudinally equally spaced transverse notches communicating with said slot, means for releasably locking said bar in selected positions of longitudinal adjustment including locking lugs spaced apart longitudinally a distance equal to the spacing between said notches and projecting into said slot, said lugs being adapted to enter adjacent notches upon rotation of said bar, said releasable locking means also including means for restricting rotation of said bar when said locking lugs are in adjacent notches so as to lock said anchor device in longitudinally adjusted position with respect to said elongated tubular member, means for tying down and holding cargo upon said support structure including an elongated flexible element adapted to be connected to the cargo, means for holding said flexible element in tension, said anchor device having a guide member engaging said flexible element between said holding means and the cargo to determine the direction of the tension applied to said cargo by said flexible element, said guide member comprising a sheave under which said flexible element extends, a bracket rotatably supporting said sheave, and means pivotally mounting said bracket on said locking lugs permitting oscillation thereof transversely of said elongated tubular member.

3. Tiedown structure comprising means for tying down and holding cargo upon a longitudinally extending support structure of a transport vehicle including an elongated flexible element adapted to be connected to the cargo, a tensioning device mounted in fixed position on said support structure for holding said flexible element in tension, an elongated tubular member secured lengthwise upon said support structure, an anchor device including a bar longitudinally slidable and rotatable within said elongated tubular member, said elongated tubular member having a longitudinal slot in a side wall thereof and having longitudinally spaced, transverse notches communicating with said slot, means for releasably locking said bar in selected positions of longitudinal adjustment including a locking lug projecting from said bar into said slot and adapted to enter a selected notch upon rotation of said bar, said releasable locking means also including means for restricting rotation of said bar when said locking lug is in a notch so as to lock said anchor device in longitudinally adjusted position with respect to said elongated tubular member, said anchor device having a guide member engaging said flexible element between said tensioning device and the cargo to determine the direction of the tension applied to the cargo by said flexible element.

4. The tiedown structure defined in claim 3, wherein said guide member comprises a sheave under which said flexible element extends, and a pivotally mounted bracket rotatably supporting said sheave and permitting oscillation of said sheave transversely of said elongated tubular member.

5. The tiedown structure defined in claim 3, wherein said guide member comprises an elongated tube extending paralle to said bar through which said flexible element extends, the internal cross section of said tube being a minimum at a point intermediate its ends and gradually increasing in opposite directions toward its ends, said means for restricting rotation of said bar when said locking lug is in a notch permitting limited oscillation of said bar and corresponding oscillaton of said tube transversely of said elongated tubular member.

6. The tiedown structure defined in claim 3, wherein said means for restricting rotation of said bar comprises a locking dog mounted on said bar and movable to operative and inoperative positions, said dog in its operative position being engageable with the longitudinal edges of said longitudinal slot to restrict rotation of said bar relative to said elongated tubular member and in its inoperative position inwardly clearing said longitudinal edges to permit sufficient rotation of said bar relative to said elongated tubular member to effect withdrawal of said locking lug from a notch.

References Cited
UNITED STATES PATENTS

| | | | |
|---|---|---|---|
| 1,993,481 | 3/1935 | Kellett | 105—366 |
| 2,205,273 | 6/1940 | Radey | 105—368 |
| 2,559,185 | 7/1951 | Carroll | 280—179 |
| 2,969,023 | 1/1961 | Chapman et al. | 105—368 |
| 3,038,740 | 6/1962 | Blunden | 105—368 |
| 3,158,108 | 11/1964 | Sharp | 105—369 |

DRAYTON E. HOFFMAN, Primary Examiner

U.S. Cl. X.R.
248—361; 280—179